(12) United States Patent
Ding et al.

(10) Patent No.: US 7,757,554 B2
(45) Date of Patent: Jul. 20, 2010

(54) HIGH ACCURACY MASS FLOW VERIFIER WITH MULTIPLE INLETS

(75) Inventors: Junhua Ding, Tewksbury, MA (US); Kaveh Zarkar, Andover, MA (US)

(73) Assignee: MKS Instruments, Inc., Andover, MA (US)

( * ) Notice: Subject to any disclaimer, the term of this patent is extended or adjusted under 35 U.S.C. 154(b) by 19 days.

(21) Appl. No.: 12/050,597

(22) Filed: Mar. 18, 2008

(65) Prior Publication Data

US 2009/0112504 A1 Apr. 30, 2009

Related U.S. Application Data (63) Continuation-in-part of application No. 11/769,435, filed on Jun. 27, 2007, now Pat. No. 7,461,549, and a continuation-in-part of application No. 11/479,092, filed on Jun. 30, 2006, now Pat. No. 7,474,968, and a continuation-in-part of application No. 11/090,120, filed on Mar. 25, 2005, now Pat. No. 7,174,263.

(51) Int. Cl.
*G01F 3/14* (2006.01)
(52) U.S. Cl. ....................................... 73/239
(58) Field of Classification Search ............... 73/239, 73/865, 861, 204.22; 37/1.35; 137/2, 486; 702/45
See application file for complete search history.

(56) References Cited

U.S. PATENT DOCUMENTS

| | | | |
|---|---|---|---|
| 5,526,674 A | 6/1996 | Korpi | |
| 5,684,245 A | 11/1997 | Hinkle | |
| 6,955,072 B2 | 10/2005 | Zarkar et al. | |
| 7,412,986 B2* | 8/2008 | Tison et al. | 137/12 |
| 7,461,549 B1* | 12/2008 | Ding et al. | 73/239 |

2006/0005882 A1 1/2006 Tison et al.

(Continued)

FOREIGN PATENT DOCUMENTS

EP 0 890 828 A1 1/1999

(Continued)

OTHER PUBLICATIONS

International Search Report from corresponding PCT Application No. PCT/US2009/031496.

(Continued)

*Primary Examiner*—Jewel Thompson
(74) *Attorney, Agent, or Firm*—McDermott Will & Emery LLP (57) ABSTRACT

A high accuracy mass flow verifier (HAMFV) which provides high measurement accuracy over a wide flow verification range with low inlet pressures is disclosed for verifying flow measurement by a fluid delivery device. The HAMFV includes a chamber defining a plurality N of inlets with upstream valves, an outlet with a downstream valve, a pressure sensor and a temperature sensor configured to measure the pressure and the temperature of the fluid within the chamber, respectively. A plurality N of critical flow nozzles is located adjacent to the corresponding upstream valve. The HAMFV further includes a controller configured to activate one of the plurality N of critical flow nozzles based on the desired flow verification range and the fluid type by opening the corresponding upstream valve and closing all other upstream valves. At least two of the plurality N of critical flow nozzles have different cross-sectional areas.

22 Claims, 3 Drawing Sheets

U.S. PATENT DOCUMENTS

2006/0123921 A1 6/2006 Tison et al.
2006/0283254 A1 12/2006 Ding et al.

FOREIGN PATENT DOCUMENTS

| WO | 0233361 | 4/2002 |
|---|---|---|
| WO | 2006017116 | 2/2006 |
| WO | 2007008509 | 1/2007 |

OTHER PUBLICATIONS

Written Opinion from corresponding PCT Application No. PCT/US2009/031496.

MKS Instruments, Inc., Gas Box Rate of Rise In Situ Flow Verifier the BGROR Bulletin GBROR, Aug. 1999, 6 pp.

MKS Instruments, Inc. Tru-Flow Mass Flow Verifier Model GBR3A, Bulletin Tru-Flo, May 2001, 4 pp.

\* cited by examiner

HIGH ACCURACY MASS FLOW VERIFIER WITH MULTIPLE INLETS

CROSS-REFERENCE TO RELATED APPLICATIONS

This application is a continuation-in-part application of: 1) U.S. patent application Ser. No. 11/090,120 (the "'120 application") filed on Mar. 25, 2005 now U.S. Pat. No. 7,174,263, entitled "External Volume Insensitive Flow Verification"; 2) U.S. patent application Ser. No. 11/479,092 (the "'092 application) filed on Jun. 30, 2006 now U.S. Pat. No. 7,474,968, entitled "Critical Flow Based Mass Flow Verifier"; (3) U.S. patent application Ser. No. 11/769,435 (the "'435 application") filed on Jun. 27, 2007 now U.S. Pat. No. 7,461,549, entitled "Mass Flow Verifiers Capable of Providing Different Volumes, And Related Methods." The contents of these applications are incorporated herein by reference in their entireties as though fully set forth.

BACKGROUND

High-precision fluid delivery and measurement systems such as mass flow controllers (MFCs), mass flow ratio controllers (FRCs), and mass flow meters (MFMs) are useful in applications such as semiconductor wafer fabrication and other types of materials processing. In many instances, the accuracy of these fluid delivery systems need to be verified.

Mass flow verifiers (MFVs) may be used to verify the accuracy of an MFC, FRC, MFM, or other device-under-test (DUT). One type of a mass flow verifier is a rate-of-rise (ROR) flow verifier. A typical ROR flow verifier may include a chamber volume, a pressure sensor, a temperature sensor, and two isolation valves, one upstream and one downstream. The valves may be closed during idle, and may open when a run is initiated, allowing flow of fluid from the MFC (or MFM) through the flow verifier. Once fluid flow has stabilized, the downstream valve may be closed, and as a result the pressure may begin to rise in the volume. The pressure transducer may measure the pressure rise. This measurement may be used to calculate the inlet flow rate to the MFV, thereby verifying the flow accuracy performance of the DUT.

The accuracy of a MFV may be improved by increasing the measurement time. It is more challenging, however, to construct a MFV that provides high measurement accuracy for very low flow rate range and at the same time provides a wide flow verification range with low inlet pressures.

A MFV that provides improved accuracy over a wider flow range, while not exceeding a desirable inlet pressure, is therefore desirable.

SUMMARY

A high accuracy mass flow verifier (HAMFV) for verifying flow measurement of a fluid delivery device includes a chamber volume that defines a plurality N of inlets, and an outlet. The HAMFV may include upstream valves for each of the N inlets, and a downstream valve for the outlet. The HAMFV may further include a pressure sensor configured to measure the pressure of the fluid within the chamber volume.

The HAMFV may further include a plurality N of critical flow nozzles. Each critical flow nozzle may be located adjacent to a corresponding upstream valve of one of the inlets. The HAMFV may further include a controller configured to selectively activate one of the plurality N of critical flow nozzles, based on the desired flow verification range and the fluid type, by opening the corresponding upstream valve and closing all other upstream valves. At least two of the plurality N of critical flow nozzles may have different cross-sectional areas.

The HAMFV can provide high measurement accuracy over a wide flow verification range with low inlet pressures.

DETAILED DESCRIPTION

In the present disclosure, a high accuracy mass flow verifier is described that uses a plurality of critical flow nozzles of different sizes. The use of multiple critical flow nozzles allows the HAMFV to operate over a wider flow range while not exceeding the inlet pressure requirement of the HAMFV. For a relatively high flow rate verification range, nozzles having relatively large sizes provide a relatively low inlet pressure to the HAMFV, so that the HAMFV meets the maximum inlet pressure requirement for MFVs (safety requirement). For a relatively low flow rate verification range, nozzles having relatively small sizes provide a relatively large critical flow period or a long measurement time, thereby improving the pressure signal to noise ratio and thus the accuracy of flow verification.

Figure 1:
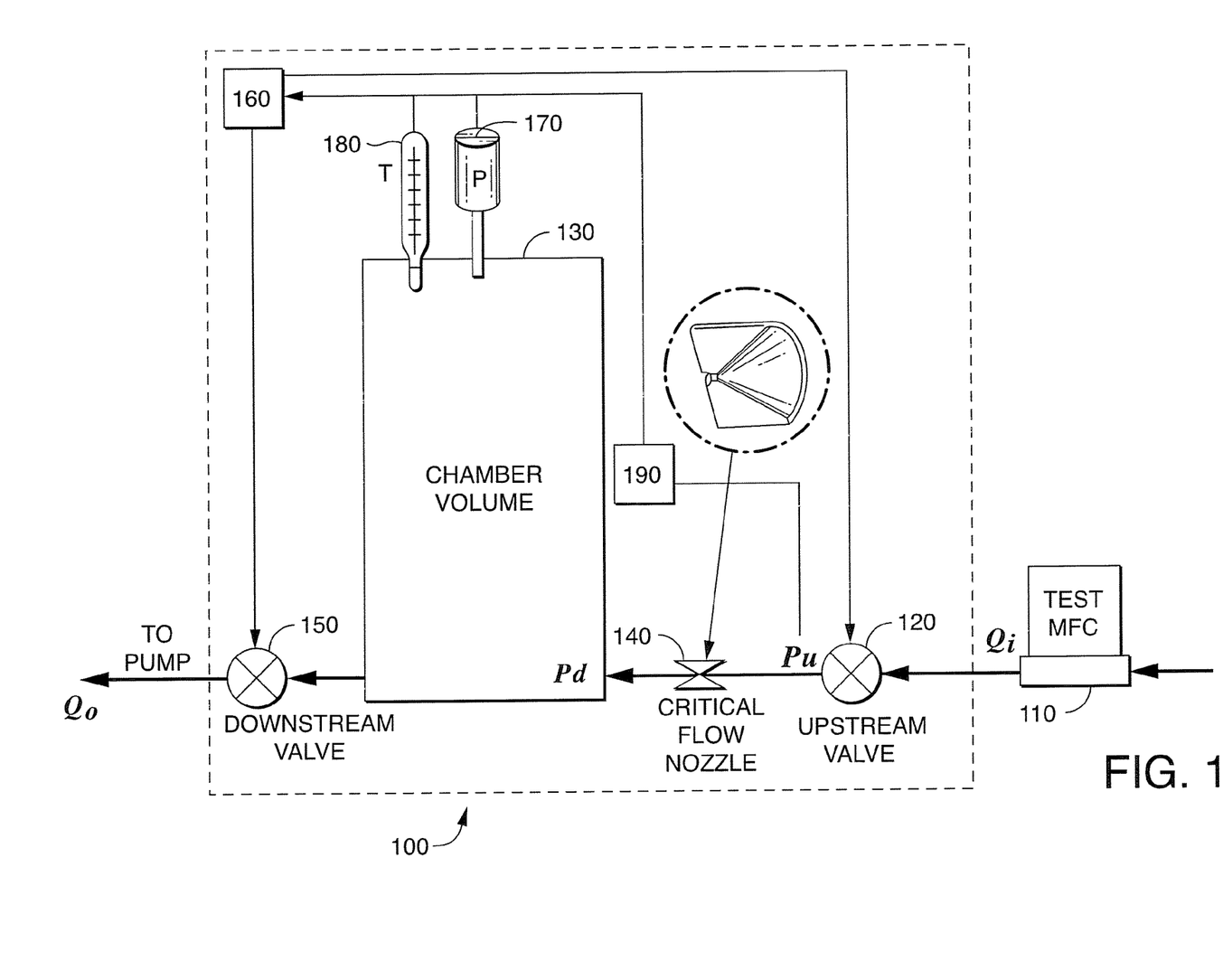
FIG. 1 illustrates a mass flow verifier including a single critical flow nozzle.

FIG. 1 illustrates a mass flow verifier including a single critical flow nozzle, as described for example in the MKS-180 parent application. In the embodiment illustrated in FIG. 1, the MFV 100 is a rate-of-rise type of MFV in which the rate of rise of pressure of fluid flowing into an enclosed chamber is measured and used to verify the flow rate into the chamber. In particular, the MFV 100 is a critical flow based MFV that includes a flow restrictor 140, which is a critical flow nozzle 140 in the illustrated embodiment.

As described further below, the critical flow nozzle 140 maintains the flow through the nozzle 140 constant, so that the mass flow testing by the MFV 100 is substantially insensitive to the rising pressure within the chamber. The critical flow nozzle 140 thus greatly minimizes the downstream pressure disturbance to the DUT such that the DUT has minimum flow fluctuation during the flow verification process. The critical flow nozzle 140 also renders the mass flow verification by the MFV 100 substantially insensitive to any external volume between the critical flow nozzle 140 and the DUT. In fact, the external volume between the critical flow nozzle 140 and the DUT is irrelevant to flow rate verifications or other calculations by critical flow based MFVs. This property is called external volume insensitivity (EVI). The EVI property of critical flow based MFVs greatly simplifies the integration of MFVs to gas panels on semiconductor processing tools because there is no need to determine external volumes between a critical flow based MFV and DUTs with different flow paths.

The MFV 100 includes an enclosed chamber volume 130 that receives a flow of a fluid from a DUT 110. The DUT 110 is typically a mass flow controller or a mass flow ratio controller that delivers the flow rate of the fluid. A downstream outlet valve 150 shuts on and off the flow of the fluid from the chamber 130. An upstream inlet valve 120 shuts on and off the flow of fluid from the DUT 110 into the chamber 130. The MFV 100 further includes a pressure sensor 170 and a temperature sensor 180 configured to measure the pressure and the temperature of the fluid within the chamber 130, respectively.

The basic principle of a ROR MFV is a mass balance over the chamber 130. Using the mass balance equations, and applying the ideal gas law to the gas in the chamber, the inlet gas flow rate can be obtained by measuring the gas pressure and the gas temperature in the chamber of MFV according to the following equation:

$$Q_{in} = \frac{k_0 \cdot T_{stp} \cdot V_c}{P_{stp}} \frac{d}{dt}\left(\frac{P}{T}\right) \quad (1)$$

where $k_0$ is a conversion constant, namely $6 \times 10^7$ in sccm (standard cubic centimeters per minute) units or $6 \times 10^4$ in slm (standard liters per minute) units; $P_{stp}$ is the standard pressure ($1.01325 \times 10^5$ Pa), $T_{stp}$ is the standard temperature (273.15 K), where P is the chamber gas pressure, $V_c$ the chamber volume, and T is the gas temperature.

The MFV 100 includes a controller 160 that receives the output signals from the pressure sensor 170 and the temperature sensor 180, and controls the operation of the upstream valve 120 and the downstream valve 150. The controller 160 measures a rate of rise in pressure of the fluid within the chamber after the downstream valve is closed, and using the measured rate of rise of pressure over time and the temperature to calculate the flow rate of the fluid from the DUT into the chamber according to Eq. (1), thereby verifying flow measurement by the DUT.

A typical mass flow verification procedure is as follows:
1. Open both the upstream valve 120 and the downstream valve 150;
2. Give a flow set point for the DUT;
3. Wait until the chamber pressure is at steady state;
4. Start to record the chamber gas pressure and the chamber gas temperature for flow calculation;
5. Shut the downstream valve 150 so that the chamber pressure rises;
6. Wait for a period for flow verification;
7. Open the downstream valve 150;
8. Stop recording the chamber gas pressure and the chamber gas temperature;
9. Calculate and report the verified flow based on Eq. (1).

The critical flow nozzle 140 is configured to maintain the flow of the fluid to a critical flow, at which point the varying chamber pressure or the downstream pressure of the nozzle will not affect the inlet mass flow into the chamber volume. In the critical flow condition, the flow through the nozzle ($Q_{in}$) is determined by the upstream pressure of the nozzle ($P_u$) only and it is not affected by the downstream pressure of the nozzles ($P_d$) as described by the following equation:

$$Q_{in} = C \cdot A \cdot P_u \cdot f_g(M, \gamma, T) \quad (2)$$

$$\text{for } \frac{P_d}{P_u} \leq a_{pc} = \left(\frac{2}{\gamma+1}\right)^{\frac{\gamma}{\gamma-1}} \quad (3)$$

$$\text{where } f_g(M, \gamma, T) = \left(\frac{R \cdot T}{M} \frac{2\gamma}{\gamma+1}\right)^{1/2} \cdot \left(\frac{2}{\gamma+1}\right)^{1/(\gamma-1)} \quad (4)$$

In the above equations, C is the discharge coefficient of the nozzle, A is the cross-sectional area of the nozzle orifice, $P_u$ is the upstream pressure of the nozzle, $P_d$ is the downstream pressure of the nozzle which is also the chamber pressure of MFV 100, R is the universal gas constant, T is the gas temperature, M is the gas molecular weight, and γ the ratio of specific heats of the gas which is defined as $\gamma = C_p/C_v$, where $C_p$ is heat capacity of the fluid at constant pressure, and $C_v$ is heat capacity of the fluid at constant volume. In order for the critical flow condition to be satisfied, the ratio of the upstream pressure to the downstream pressure of the nozzle must be less than the critical pressure ratio, $a_{pc}$, which is determined by the properties of the fluid or gas in the chamber, according to Eq. (3).

As long as the critical flow condition of Eq. (3) maintains, the downstream pressure of the nozzle or the chamber pressure will not influence the mass flow rate across the restriction, and the only way to increase the flow rate is to increase the upstream pressure according to Eq. (2).

The critical flow based MFV has a critical flow nozzle or orifice at the entrance of the chamber of a ROR verifier, as illustrated in FIG. 1. If both the upstream valve 120 and the downstream valve 150 of the MFV 100 are open and the flow of the DUT is at steady state and the critical nozzle is properly sized, the pressure ratio between the downstream pressure of the restrictor (the chamber pressure) and the upstream pressure of the restrictor is less than the critical pressure ratio $a_{pc}$. Therefore the flow across the flow restrictor is a critical flow and independent of the chamber pressure according to Eq. (2). At this steady state moment, the flow through the restrictor is equal to the flow delivered by the DUT and the upstream pressure of the restrictor (the downstream pressure of the DUT) is constant. When the downstream valve 150 is shut for flow verification, the chamber pressure rises.

As long as the pressure ratio between the chamber pressure and the upstream pressure of the restrictor is less than the critical pressure ratio $a_{pc}$, the flow through the restrictor is still a critical flow and independent of the rising chamber pressure. Therefore, the flow through the restrictor is unchanged, the upstream pressure of the restrictor is unchanged, and there is no downstream pressure disturbance to the DUT even as the chamber pressure is increasing. If the increasing chamber pressure exceeds the critical pressure ratio ($a_{pc}$), the flow through the restrictor is not a critical flow and it is dependent on both the upstream and the downstream pressure of the restrictor. As a result, the flow through the restrictor is not equal to the flow delivered by the DUT, the upstream pressure of the restrictor changes and there is a downstream pressure disturbance to the DUT.

The critical flow period of MFV is defined as the period between the moment when the downstream valve is completely shut and the moment when the rising chamber pressure exceeds the critical pressure ratio $a_{pc}$. During the critical flow period, the flow through the restrictor is a constant critical flow and independent of the chamber pressure. The critical flow period, $t_{cf}$, can be derived as follows:

$$t_{cf} = \frac{V_c \cdot (a_{pc} - a_{p0})}{C' \cdot A \cdot f_g(M, \gamma, T)} \quad (5)$$

where $a_{p0}$ is the initial pressure ratio between the chamber pressure and the upstream pressure of the restrictor at the moment when the inlet flow is stabilized before the downstream valve is shut.

As seen from equation (5), the critical flow period $t_{cf}$ is dependent on the gas properties, the gas temperature, and the geometry of the MFV including the critical flow nozzle and chamber volume. If the verification time of a MFV is within the critical flow period, the flow across the nozzle is a constant critical flow and the rising chamber pressure does not disturb the downstream pressure of the DUT. This greatly minimizes the downstream disturbance to the DUT.

The flow restrictor such as a critical flow nozzle or orifice separates the chamber of a ROR verifier from the external plumbing to the DUT as long as the critical flow condition of Eq. (3) holds. If the flow verification period is within the critical period, the critical flow through the restrictor is equal to the flow rate of the DUT and the pressure distribution along the path from the DUT to the MFV is stable. Clearly, the external volume between the critical flow nozzle and the DUT is irrelevant to the flow calculation of Eq. (1). There is no need for setup calibration process to determine the external volume between the flow restrictor and the DUT for flow verification calculation. This is opposite to traditional ROR MFVs which do not have flow restrictors at the inlet entrance. For traditional ROR MFVs, the pressure distribution changes along the path from the DUT to the MFV during the flow verification period. Therefore, the external volume between the DUT and the MFV has to be determined and factored into the chamber volume ($V_c$) in Eq. (1) for flow calculation.

Figure 2:
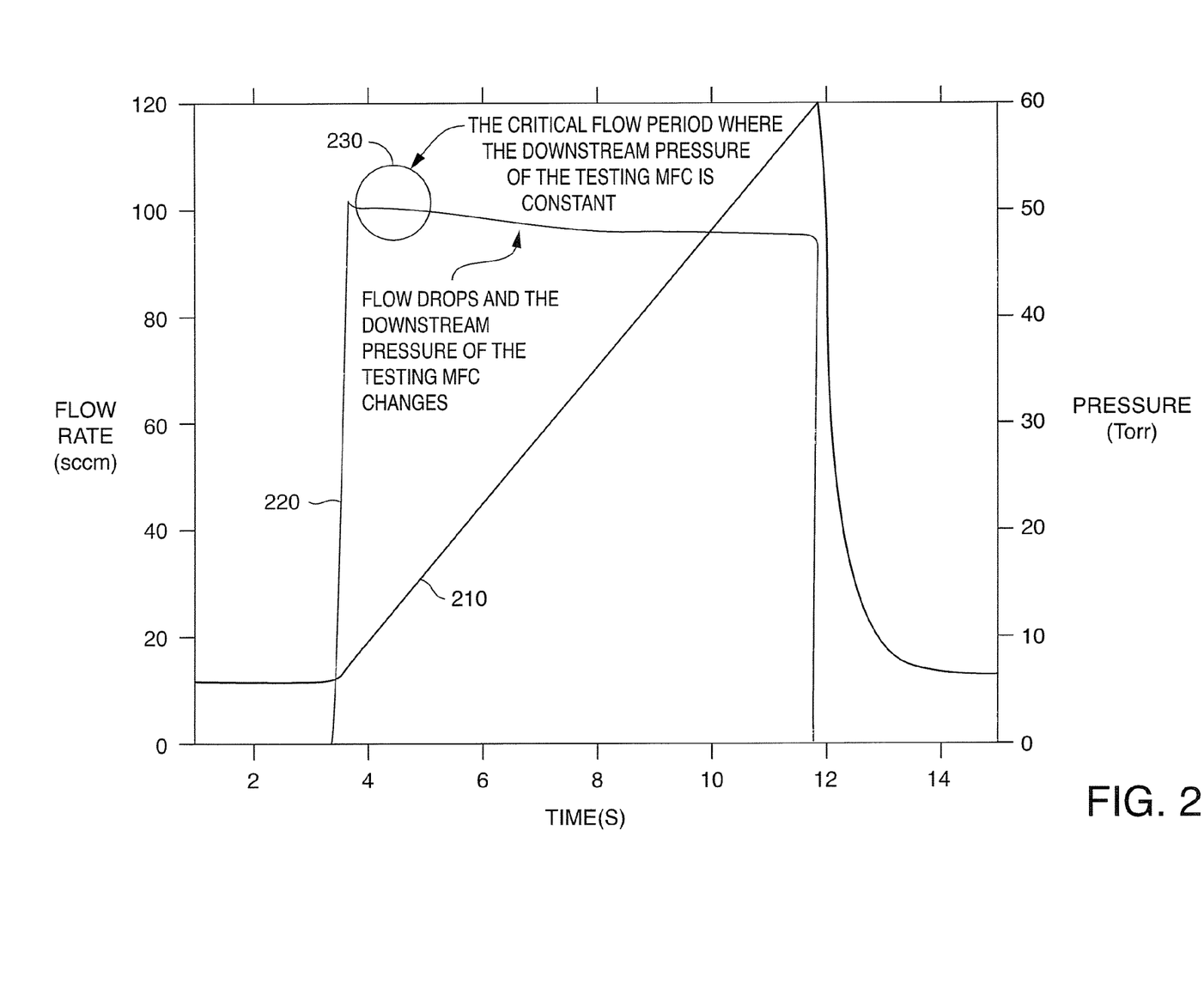
FIG. 2 is a graph illustrating a critical flow period.

FIG. 2 is a graph illustrating the critical flow period, as well the response of the critical flow based MFV 100. The graph 210 represents the pressure of the fluid within the chamber, which rises when the downstream valve is closed. The graph 220 represents the flow rate of the fluid across the critical nozzle or the inlet flow to the chamber volume. The critical flow period of MFV is indicated in FIG. 2 with reference numeral 230. As seen in FIG. 2, during the critical flow period, the inlet flow through the nozzle is a critical or choked flow, the rising chamber pressure will not affect the inlet flow and the upstream pressure of the nozzle (which is also the downstream pressure of the DUT). After the critical flow period lapses, the inlet flow rate drops, and the downstream pressure of the DUT changes.

If the chamber pressure can be kept always lower than the critical pressure ratio limit during the flow verification, the flow through the nozzle will always be at the critical flow condition and the varying chamber pressure will not disturb the downstream pressure of the DUT, which substantially minimizes the fluctuation of the actual flow of the DUT. The inlet flow across the nozzle to the chamber volume is equal to the flow rate of the DUT. There is no need to determine the external volume between the DUT and the MFV for flow verification.

Figure 3:
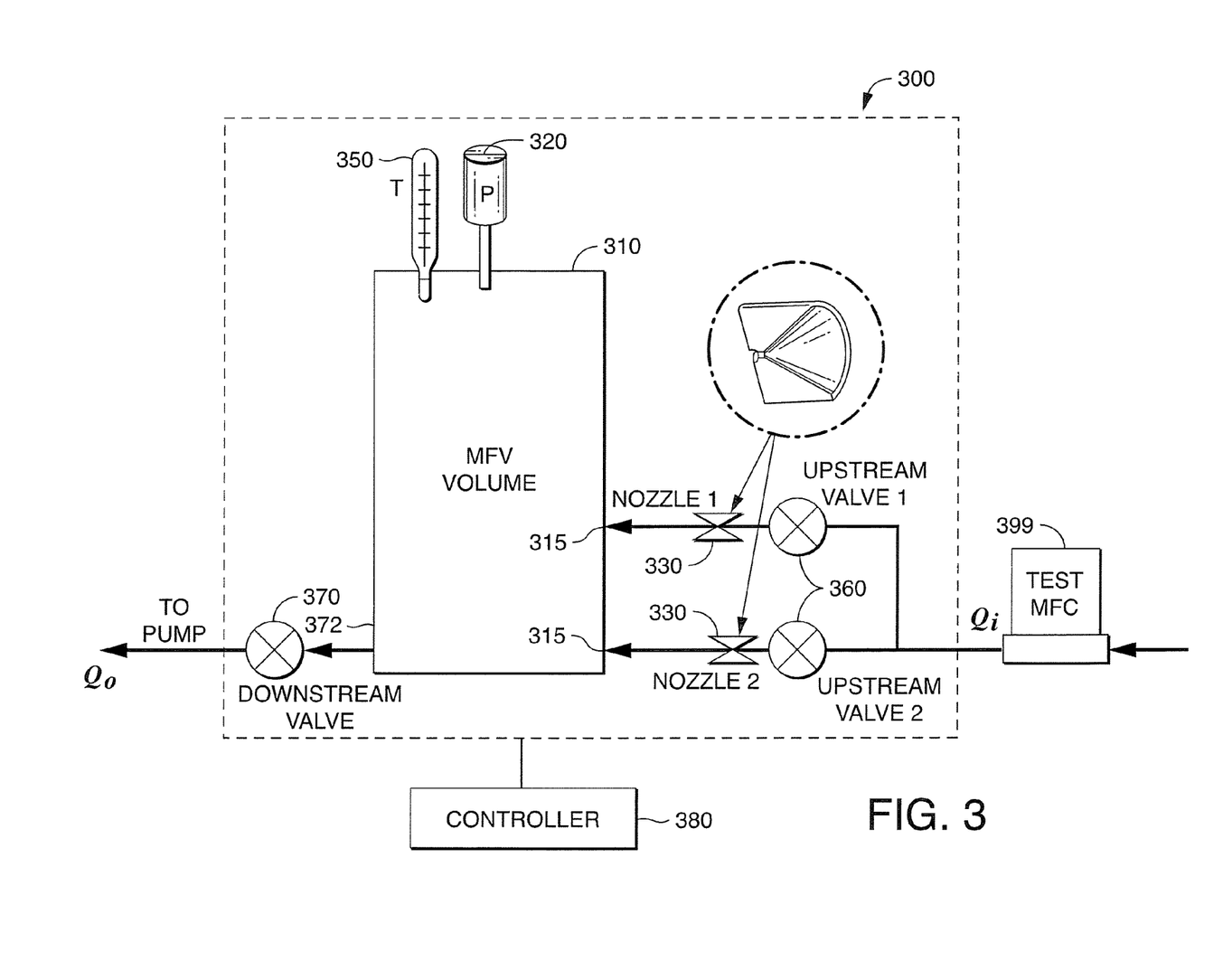
FIG. 3 illustrates a high accuracy mass flow verifier including a plurality of inlets and critical flow nozzles, in accordance with one embodiment of the present disclosure.

FIG. 3 illustrates a high accuracy mass flow verifier (HAMFV) 300 including a plurality of inlets and a plurality of critical flow nozzles, in accordance with one embodiment of the present disclosure. The HAMFV 300 is configured to verify measurement of a flow rate of a fluid by a device 399, such as an MFC, an MFM, or and FRC, by way of example. The HAMFV 300 includes a chamber volume 310, a pressure sensor 320, a temperature sensor 350, an outlet 372 with a downstream valve 370, and a plurality N of inlets 315 with an upstream valve 360 and a critical flow nozzle 330 for each inlet. The chamber 310 can receive a flow of the fluid from the DUT through any one of the N inlets.

Each one of the plurality N of critical flow nozzles 330 is located adjacent to a corresponding one of the inlets 315. In the embodiment illustrated in FIG. 3, N=2, i.e. the illustrated embodiment includes two inlets and two critical flow nozzles, one at each inlet. It should of course be understood that N is not limited to 2, and that in other embodiments, the chamber may have more than 2 inlets and a corresponding number (greater than 2) of critical flow nozzles.

Each one of the plurality N of critical flow nozzles 330 is located adjacent to a corresponding one of the upstream valves 360. In the embodiment illustrated in FIG. 3, the critical nozzles are located after the upstream valves. It should of course be understood that in other embodiments, the critical flow nozzles can also be located before the upstream valves. One of the upstream valves is selected to be opened based on the flow rate range and the gas (or other fluid) type, and all other upstream valves are closed during the whole flow verification period. Therefore, only one of the critical flow nozzles is activated during the flow verification period.

Each one of the plurality N of critical flow nozzles 330 is configured to maintain, during a critical flow time period $t^i_{cf}$ (i=1, ..., N) for that nozzle when it is activated, the flow rate of the fluid through the critical flow nozzle substantially constant and substantially insensitive to variation in pressure within the chamber, in the manner described in FIG. 1 above. The mathematical expression for the critical flow time period $t_{cf,i}$ for the i-th critical flow nozzle can be readily obtained by analogy to equation (5) as $$t_{cf,i} = \frac{V_c \cdot (a_{pc} - a_{p0})}{C_i \cdot A_i \cdot f_g(M, \gamma, T)} \quad (6)$$

where $A_i$ (i=1, ... N) is cross-sectional area of the nozzle throat for the i-th nozzle, $C_i$ the discharge coefficient for the i-th nozzle, and all other variables are as defined earlier in conjunction with equation (5) above. Note that the critical flow time period $t_{cf,i}$ is defined between a point in time when the downstream valve is shut, to a point in time when a ratio between $P_d$ and $P_u$ exceeds the critical pressure ratio limit $a_{pc}$ when the i-th critical flow nozzle is activated.

As seen in Eq. (6), for all i (i=1, ..., N), the critical flow time period $t_{cf,i}$ (i=1, ..., N) for the i-th critical flow nozzle is inversely proportional to the cross-sectional area $A_i$ of the i-th critical flow nozzle. The critical flow period $t_{cf,i}$ for the i-th nozzle (i=1, ..., N) can thus be increased by decreasing the nozzle size.

By increasing the critical flow period, the HAMFV 300 can charge the volume longer in order to increase the pressure change ($\Delta P$) and hence increase the signal to noise ratio. The longer verification period can also provide more measurement data samples to be used to filter out the measurement noise. In these two ways, the large value of the critical flow period can improve the accuracy and repeatability for mass flow verification, especially for low flow range, for example 1-100 sccm Nitrogen (N2) equivalent flow. Therefore, if a HAMFV 300 has multiple inlets with different size of critical flow nozzles, the HAMFV 300 can choose an inlet whose critical flow nozzle has a relatively small size, which provides a large $t_{cf,i}$ for low flow verification.

There is a maximum inlet pressure requirement for MFVs, for example, the maximum inlet pressure to a MFV should be less than 100 Torr for 3,000 sccm N2 equivalent flow. According to Eq. (2), the inlet pressure to a critical flow based MFV, which is the upstream pressure of the critical flow nozzle, is inverse to the cross-sectional area of the nozzle throat, $A_i$, for the same amount of inlet flow. HAMFV 300 can choose the inlet whose critical flow nozzle has a relatively large size that meets the maximum inlet pressure requirement for high flow verification. In this way, HAMFV 300 can extend its flow rate verification range to very high flow rate without violating the maximum inlet pressure requirement. Therefore, at least two of the plurality N of critical flow nozzles have different cross-sectional areas. Of course, in some embodiments, more than two of the N critical flow nozzles have different cross-sectional areas. In some embodiments, all N critical flow nozzles have cross-sectional areas that are different.

The HAMFV 300 includes a controller 380 configured to selectively activate one of the plurality N of critical flow nozzles 330 (say the i-th nozzle) for a flow verification operation, by opening the corresponding i-th upstream valve (i=1, ..., N) and closing all other upstream valves 360. In one embodiment, the selection of the i-th nozzle is based on the desired flow rate verification range and on the fluid or gas type, which may be supplied by the user.

In one embodiment, the controller 380 receives a flow verification command from a host controller or a user. The flow verification command may include the information of the desired operational flow range and the fluid type. In this embodiment, the controller 380 then selectively activates one of the plurality N of critical flow nozzles based on the information it received relating to the desired operational flow range and the type of fluid or gas. In the present application, to "activate" a critical flow nozzle means: to make it possible for the fluid (whose flow rate is being verified by the HAMFV) to flow through that critical flow nozzle. Of course, the flow of the fluid through the critical flow nozzle will satisfy the critical flow condition discussed above. In one embodiment, a critical flow nozzle may be activated by opening only the upstream valve corresponding to that critical flow nozzle, and closing all other upstream valves.

Upon activation of the i-th critical flow nozzle (i=1, ..., N), the controller is configured to verify the flow rate of the DUT in the manner described in paragraph above. When the i-th critical flow nozzle (i=1, ..., N) is selected by the controller 380, the fluid from the device 399 flows through the selected i-th nozzle, the flow being such as to satisfy the critical flow condition during the critical flow time period $t_{cf,i}$ of the nozzle.

In one embodiment, the controller 380 is further configured to control the operation of the downstream valve 370, the upstream valves 360, the pressure sensor 320, and the temperature sensor 350, in such a way the controller 380 can measure and determine a rate of rise in pressure of the fluid within the chamber after the downstream valve is closed. The controller 380 activates (and/or de-activates, if appropriate) at the right times the downstream valve 370 and the upstream valves 360, so that the controller 380 can measure the pressure and temperature of the fluid within the chamber by using the pressure sensor 320 and the temperature sensor 350, respectively. The controller 380 then uses the rate of rise in pressure and the temperature that it has measured to calculate the flow rate of the fluid from the device into the chamber according to Eq. (1), thereby verifying the flow measurement by the device 399.

Upon activation of the i-th critical flow nozzle by the controller 380, the pressure sensor and the temperature sensor are configured to make measurements within the critical time period $t_{cf,i}$ for the i-th critical flow nozzle, so that flow verification by the mass flow verifier is substantially independent of the varying chamber pressure and the external volume between the mass flow verifier and the DUT.

In operation, a method of verifying measurement of a flow of a fluid by a device may include placing a plurality N of critical flow nozzles along the flow path of the fluid between a chamber in a mass flow verifier and the device (DUT), then activating an i-th one of the N critical flow nozzles (i=1, ..., N) based on the desired flow rate verification range and the gas type by opening the i-th upstream valve and closing all other upstream valves.

In the beginning of the flow verification, both the i-th upstream valve and the downstream valve are kept open for the flow (along a flow path from the device though the i-th inlet into the chamber) to be stabilized, i.e. there is no pressure change along the flow path, and the flow rate of the fluid into the chamber reach a steady state. Then the downstream valve at the outlet of the chamber is closed, so that pressure of the fluid within the chamber begins to rise. Then, measurements of pressure and temperature of the fluid into the chamber are made within the critical flow time period $t_{cf,i}$ for computing the flow rate of the fluid according to Eq. (1) and thus verifying the flow measurement by the DUT. Because the flow rate verification period of the MFV is within the critical flow time period $t_{cf,i}$ defined for the i-th nozzle, flow of the fluid across the i-th nozzle and pressure of the fluid upstream of the i-th nozzle remain substantially constant and substantially insensitive to the rise of the pressure within the chamber. Besides, the external volume between the DUT and the MFV does not need to be determined for computing the flow rate.

In sum, a method of increasing accuracy and operational flow range of a mass flow verifier, which verifies the flow measurement by a fluid delivery device, may include providing a plurality N of critical flow nozzles between the flow measurement device and the chamber, then selectively activating one of the N critical flow nozzles so as to restrict flow of the fluid across the selected nozzle. In this way, the flow rate of the fluid through the selected nozzle is substantially insensitive to variations in pressure within the chamber as long as ratio of pressure downstream of the nozzle and pressure upstream of the nozzle is less than the critical pressure ratio $\alpha_{pc}$. The method may further include selecting an optimal orifice size for the critical flow nozzle, based on a desired flow verification range, the fluid type and the maximum inlet pressure requirement for MFVs.

The methods and systems described above improve the accuracy and repeatability of mass flow verification, especially for low flow range (by way of example, 1-100 sccm N2 equivalent). An accuracy of up to about +/−0.5% reading error has been attained for this range. Further, these methods and systems can increase the flow verification range (by way of example, 1 to 3000 sccm N2 equivalent), while not exceeding the maximum inlet pressure (by way of example, 100 torr for all flow range of N2 equivalent). Because critical flow nozzles are used, external volume insensitivity can be achieved. The improvements described above can be achieved using a single manometer, thereby reducing the unit cost. In sum, a high accuracy in-situ mass flow verifier can be provided for tools used in semiconductor and other materials processing.

While certain embodiments have been described of systems and methods for providing high accuracy flow verification at a wide flow range and low inlet pressures, it is to be understood that the concepts implicit in these embodiments may be used in other embodiments as well. The protection of this application is limited solely to the claims that now follow.

In these claims, reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference, and are intended to be encompassed by the claims. Moreover, nothing disclosed herein is intended to be dedicated to the public, regardless of whether such disclosure is explicitly recited in the claims. No claim element is to be construed under the provisions of 35 U.S.C. §11.2, sixth paragraph, unless the element is expressly recited using the phrase "means for" or, in the case of a method claim, the element is recited using the phrase "step for."

What is claimed is:

1. A mass flow verifier for verifying flow measurement of a fluid by a fluid delivery device, the mass flow verifier comprising:
a chamber defining a plurality N of inlets, the chamber configured to receive at each of the inlets a flow of the fluid from the device;
a pressure sensor configured to measure pressure of the fluid within the chamber;
a plurality N of critical flow nozzles, each critical flow nozzle located adjacent to a corresponding one of the inlets, each critical flow nozzle located upstream of the chamber along a flow path of the fluid from the device to the chamber through the corresponding inlet;
wherein for all i (i=1, ..., N), the i-th critical flow nozzle is configured to maintain, during a critical flow time period $t_{cf,i}$ (i=1, ..., N) for the i-th critical flow nozzle, the flow rate of the fluid through the i-th critical flow nozzle substantially constant and substantially insensitive to variation in pressure within the chamber.

2. The mass flow verifier of claim 1, further comprising a controller configured to selectively activate one of the plurality N of critical flow nozzles for a flow verification operation by the mass flow verifier.

3. The mass flow verifier of claim 2,
wherein the controller is further configured to selectively activate said one of the plurality N of critical flow nozzles based on a desired flow rate verification range for the mass flow verifier, and based on fluid type of the fluid.

4. The mass flow verifier of claim 3,
further comprising a plurality N of upstream valves, each upstream valve associated with a corresponding one of the critical flow nozzles;
wherein each one of the critical flow nozzles can be activated by opening the corresponding upstream valve and closing all other upstream valves.

5. The mass flow verifier of claim 4, wherein each critical flow nozzle is located before or after the corresponding upstream valve.

6. The mass flow verifier of claim 4, wherein each critical flow nozzle is located adjacent to the corresponding upstream valve.

7. The mass flow verifier of claim 4, further comprising a downstream valve configured to turn on or shut off flow of the fluid from an outlet of the chamber.

8. The mass flow verifier of claim 3,
wherein for all i (i=1, ..., N), the critical flow time period $t_{cf,i}$ (i=1, ..., N) for the i-th critical flow nozzle is inversely proportional to the cross-sectional area $A_i$ of said i-th critical flow nozzle; and
wherein at least two of the plurality N of critical flow nozzles have different cross-sectional areas.

9. The mass flow verifier of claim 8, wherein when the desired flow rate verification range is relatively high, critical flow nozzles having a relatively large size are configured to provide a relatively low inlet pressure to the MFV.

10. The mass flow verifier of claim 8, wherein when the desired flow rate verification range is relatively low, critical flow nozzles having a relatively small size are configured to increase the measurement time, thereby increasing accuracy of the measurement.

11. The mass flow verifier of claim 1, further comprising a temperature sensor configured to measure temperature of the fluid within the chamber.

12. The mass flow verifier of claim 1, wherein the i-th critical flow nozzle (i=1, ..., N) is configured to allow the fluid flowing therethrough to satisfy a critical flow condition during its critical flow time period $t_{cf,i}$, and wherein the critical flow condition for each one of the N critical flow nozzles is given mathematically by:

$$\frac{P_d}{P_u} \le a_{pc} = \left(\frac{2}{\gamma+1}\right)^{\frac{\gamma}{\gamma-1}}$$

where
$P_d$ is pressure of the fluid within the chamber and downstream of the i-th critical flow nozzle,
$P_u$ is pressure of the fluid upstream of the i-th critical flow nozzle,
$\gamma$ is the ratio of specific heats of the fluid defined as $\gamma=C_p/C_v$, where $C_p$ is heat capacity of the fluid at constant pressure, and $C_v$ is heat capacity of the fluid at constant volume, and
$\alpha_{pc}$ is critical pressure ratio representing the maximum allowable ratio between $P_d$ and $P_u$ for which flow of the fluid across each one of the N critical nozzles will remain substantially constant and substantially insensitive to any variation in pressure within the chamber.

13. The mass flow verifier of claim 7,
wherein the controller is further configured to control the downstream valve, the upstream valves, the pressure sensor, and the temperature sensor; and
wherein the controller is further configured to measure a rate of rise in pressure of the fluid within the chamber after the downstream valve is closed, using the measured rate of rise to calculate the flow rate of the fluid from the device into the chamber, thereby verifying measurement by the device.

14. The mass flow verifier of claim 13, wherein the critical flow time period $t_{cf,i}$ for the i-th critical flow nozzle is defined between a point in time when the downstream valve is shut, to a point in time when a ratio between $P_d$ and $P_u$ exceeds the critical pressure ratio limit, $\alpha_{pc}$, as given by:

$$t_{cf,i} = \frac{V_c \cdot (a_{pc} - a_{p0})}{C_i \cdot A_i \cdot f_g(M, \gamma, T)}$$

where
$V_c$ is the volume of the chamber in the mass flow verifier,
$a_{p0}$ is the initial pressure ratio between the upstream and the downstream of the nozzle at the moment before the downstream valve is shut,
$C_i$ is the discharge coefficient for the i-th (i=1, ..., N) critical flow nozzle,
$A_i$ (i=1, ..., N) is the cross-sectional area of the nozzle throat for the i-th nozzle,
$f_g(M, \gamma, T)$ is a function of gas properties defined as $$f_g(M, \gamma, T) = \left(\frac{RT}{M}\frac{2\gamma}{\gamma+1}\right)^{1/2}\left(\frac{2}{\gamma+1}\right)^{1/(\gamma-1)}$$

where
M is the molecular weight of the fluid,
R is the universal gas constant,
T is the temperature of the fluid, and
$\gamma$ is the ratio of specific heats of the fluid.

15. The mass flow verifier of claim 14, wherein upon activation of the i-th critical flow nozzle by the controller, the pressure sensor and the temperature sensor are configured to make measurements within the critical time period $t'_{cf}$ for the i-th critical flow nozzle, so that flow verification by the mass flow verifier is substantially independent of the varying chamber pressure and the external volume between the mass flow verifier and the DUT.

16. The mass flow verifier of claim 14, wherein upon activation of the i-th critical flow nozzle (i=1, ..., N), the controller is configured to verify the measurement of the device by:
   a) opening the downstream valve and activating the i-th upstream valve based on the desired flow verification range and the fluid type received from the host controller or the user;
   b) giving a flow set point to the DUT by the host controller or the user;
   c) waiting until pressure within the chamber reaches a steady state and stabilizes;
   d) start to measure the pressure and the temperature of the fluid within the chamber for flow verification calculation;
   e) shut the downstream valve, so that the pressure within the chamber rises;
   f) keep measuring the pressure and the temperature of the fluid within the chamber for a period less than the critical flow period $t_{cf,i}$ for the i-the critical flow nozzle, for flow verification;
   g) open the downstream valve within a critical time period as measured from when the downstream valve was shut; and
   h) compute the flow rate of the fluid into the chamber using:

$$Q_{in} = \frac{k_0 \cdot T_{stp} \cdot V_c}{P_{stp}} \frac{d}{dt}\left(\frac{P}{T}\right)$$

where $V_c$ is the chamber volume in the mass flow verifier,
   $T_{stp}$ is the standard gas temperature which is 273.15K,
   $P_{stp}$ is the standard gas pressure which is $1.01325e5\ P_a$,
   $k_0$ is about $6 \times 10^7$ in SCCM units and $6 \times 10^4$ in SLM units
   P is the pressure of the fluid measured by the pressure sensor
   T is the temperature of the fluid measured by the temperature sensor.

17. The mass flow verifier of claim 1, wherein the device comprises one of:
   a mass flow meter; a mass flow controller; and a flow ratio controller.

18. A method of verifying measurement of a flow of a fluid by a device, comprising:
   placing a plurality N of critical flow nozzles along the flow path of the fluid between a chamber in a mass flow verifier and the device;
   activating an i-th one of the N critical flow nozzles (i= 1, ..., N), so that during a critical flow time period $t_{cf,i}$ (i=1, ..., N) defined for said i-th nozzle, flow of the fluid across the i-th nozzle and pressure of the fluid upstream of the i-th nozzle remains substantially constant and substantially insensitive to the rise of the pressure within the chamber;
   causing the fluid to flow along a flow path from the device though the i-th inlet into the chamber, while an inlet valve upstream of the chamber and an outlet valve downstream of the chamber are kept open;
   allowing a flow rate of the fluid into the chamber and a pressure of the fluid within the chamber to reach a steady state;
   closing the outlet valve downstream of the chamber so that pressure of the fluid begins to rise within the chamber; and
   making measurements of fluid pressure and fluid temperature within the critical flow time period $t_{cf,i}$ to measure a rate of rise of pressure of the fluid within the chamber and using the measured rate of rise of pressure to compute the flow rate of the fluid along with the measurements of fluid temperature.

19. The method of claim 18, wherein each one of the N critical flow nozzles is constructed and arranged so that for the i-th nozzle, flow of fluid through that nozzle is restricted during a critical flow time period $t_{cf,i}$ (i=1, ..., N) for that nozzle, so that a critical flow condition is satisfied during $t_{cf,i}$ (i=1, ..., N).

20. The method of claim 18, wherein the act of computing the flow rate of the fluid comprises using a mathematical formula given by:

$$Q_{in} = \frac{k_0 \cdot T_{stp} \cdot V_c}{P_{stp}} \frac{d}{dt}\left(\frac{P}{T}\right)$$

where P and T are measured by the pressure sensor and the temperature sensor during the verification period which is within the critical flow period such that the varying chamber pressure has not impact on the downstream pressure of the DUT.

21. A method of increasing accuracy and operational flow range of a mass flow verifier that verifies measurement by a flow measurement device of the flow rate of the fluid, the mass flow verifier including a chamber configured to receive flow of the fluid from the flow measurement device, a pressure sensor configured to measure pressure of the fluid within the chamber, and a temperature sensor configured to measure temperature of the fluid within the chamber, the method comprising:
   providing a plurality N of critical flow nozzles between the flow measurement device and the chamber; and
   selectively activating one of the N critical flow nozzles by opening a corresponding upstream valve and closing all other upstream valves.

22. The method of claim 21, further comprising selecting an optimal orifice size for the critical flow nozzle, based on the desired flow verification range, the fluid type and the maximum inlet pressure requirement for MFVs.

* * * * *